United States Patent [19]

Blanz

[11] 4,108,081
[45] Aug. 22, 1978

[54] ARRANGEMENT FOR LOCKING A FREIGHT CONTAINER TO A BASE, PARTICULARLY A TRAILER OR WHEEL FRAME

[75] Inventor: Roland Blanz, Heidelberg, Fed. Rep. of Germany

[73] Assignee: Graubremse GmbH, Heidelberg, Fed. Rep. of Germany

[21] Appl. No.: 718,778

[22] Filed: Aug. 30, 1976

[30] Foreign Application Priority Data

Sep. 3, 1975 [DE] Fed. Rep. of Germany ....... 2539081

[51] Int. Cl.$^2$ ............................................. B61D 17/00
[52] U.S. Cl. .............................. 105/366 B; 24/221 R; 24/221 K
[58] Field of Search ................. 105/366 B; 296/35 A; 24/221 R, 221 K, 221 RC; 248/119 R

[56] References Cited

U.S. PATENT DOCUMENTS

| 3,892,436 | 7/1974 | Fathauer ...................... 105/366 B X |
| 3,924,544 | 12/1975 | Grau et al. ........................ 105/366 B |

Primary Examiner—Robert G. Sheridan
Attorney, Agent, or Firm—Max Fogiel

[57] ABSTRACT

An arrangement for locking a freight container to a wheeled base in which spring-loaded clamping bolts are located on the base and engage brackets on the freight container with both form and force linkage. Each of the clamping bolts is provided with a locking head and is changeable from a clamping position to a release position by a rotary lifting motion with the use of a grooved curve guide. A pressure-charged spring-loaded piston is rotatable relative to a clamping bolt so that the clamping bolt is axially displaceable on the piston. The grooved curve guide is located between the clamping bolt and the piston, and two opposite power sources apply the relative motion of the clamping bolt and the piston along the grooved curve guide. The two power sources can be actuated independently of one another, and one of the power sources is a pressure chamber located between the clamping bolt and the piston for movement of the clamping bolt into final position of the grooved curve guide, corresponding to the locking and clamping position.

16 Claims, 10 Drawing Figures

Fig. 5
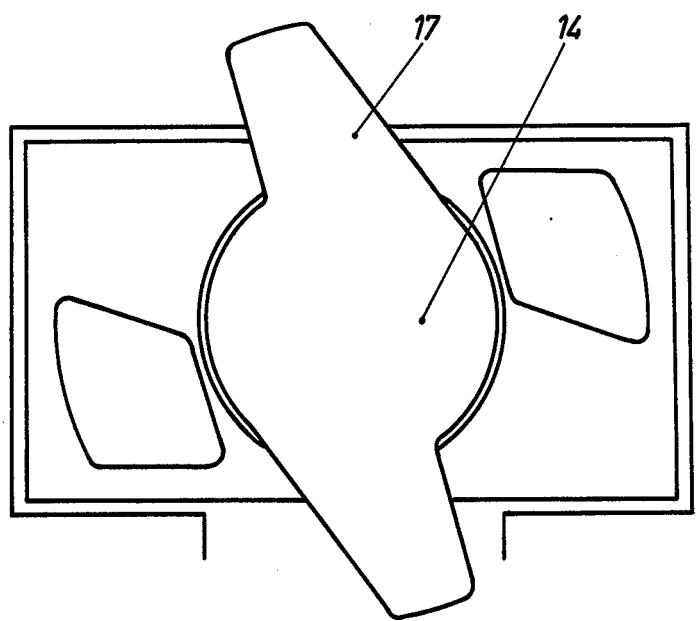
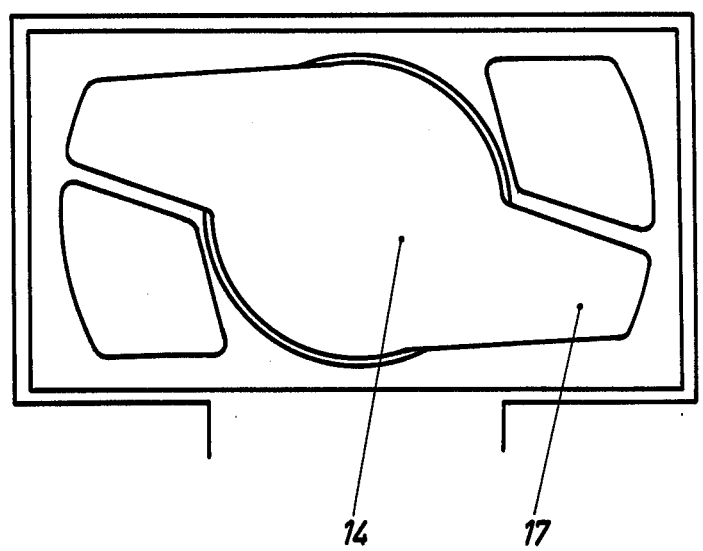
Fig. 6

ARRANGEMENT FOR LOCKING A FREIGHT CONTAINER TO A BASE, PARTICULARLY A TRAILER OR WHEEL FRAME

BACKGROUND OF THE INVENTION

The present invention relates to an arrangement for locking a freight container to a base, particularly a trailer, with spring-loaded clamping bolts located on the base and engaging brackets on the freight container with both form and force linkage. Each of the clamping bolts is provided with a locking head and changeable from a clamping position to a release position by a rotary lifting motion with the use of a groove curve guide, with a pressure-load, spring-loaded piston which can rotate in relation to the clamping bolt. The term freight containers is intended to mean herein both containers and interchangeable platforms, i.e., containers which can be removed from the base (trailer) both in the vertical and horizontal direction.

German Pat. No. 2,312,402 shows an arrangement of the type described, which, however, is suited only for vertical placement of the freight container. The clamping bolt can be rotated via a groove curve guide which is located on the housing. This rotatability is accomplished by a suitable mounting in the pressure charged piston. This piston is axially displaceable, but not rotatable in the cylinder of the housing.

German Pat. No. 1,917,823 shows a locking arrangement for containers where the locking head, for the purpose of locking, is subjected to a pure rotary motion. Aslo with this arrangement it is not possible to fasten interchangeable platforms on base (trailers). The rotary motion of the locking head is purely mechanical, while disengagement and engagement of the clamping bolt uses a piston loaded on both sides.

U.S. Pat. No. 3,439,821 uses a locking device which operates with form linkage but not with force linkage, with the lock engaging the later openings of containers.

The freight containers must be secured to the transport vehicle in order to prevent shifting and cancellation of the initial stressing force. This applies to ships and airplanes, but especially for road vehicles, such as trucks and trailers, and other wheeled bases. The brackets on freight containers provided for this purpose have holes or recesses into which clamping bolts attachable to the trailer can be inserted and locked. The clamping bolts are tightened in the manner of screw spindles, with their locking head solidly engaging the bracket and thus holding the entire freight container on the base.

It is necessary to apply an initial stressing force to prevent noise, especially with road transports. However, there always is the danger that the initial stressing force becomes loose by shifts in the freight container and the freight container which has only form-links, makes disturbing noises during transport. This is prevented by a pressure spring used for continuous retightening of the pressure bolt.

It is therefore, an object of the present invention to avoid the disadvantages of the present state of the art and to provide an arrangement which can be used for the locking of removable freight containers on bases, particularly trailers. In addition to force linkage, there also must be form-linkage between the base and the freight container. In the loading position, the locking head of the clamping bolt must be lowered into the base so far that it does not hinder the horizontal sliding-under of an alternate container. An additional form-linked connection is necessary so that, if needed, the freight container together with the base can be transferred to suitable vehicles when the loading devices engage the freight containers.

Another object of the present invention is to provide an arrangement of the foregoing character which is simple in construction and may be economically fabricated.

A further object of the present invention is to provide an arrangement, as described, which has a substantially long operating life and may be readily and economically maintained in service.

SUMMARY OF THE INVENTION

The objects of the present invention are achieved by providing that the clamping bolt is located at the piston with axial displacement, and the groove curve guide is located between the clamping bolt and the piston. Two opposite-direction power sources for the relative motion of clamping bolt and piston are provided along the grooved curve guide. This provided the possibility of performing the rotary motion independently or nearly so of the lifting motion, so that especially the locking head can be lowered in the base so far that the horizontal sliding-in of an interchangeable platform is not hindered.

It is a special advantage if the two power sources can be actuated independently of one another, so that there are numerous possibilities for controlling the arrangement.

One power source for pressure-charging the clamping bolt for the purpose of movement to the grooved curve guide's final position corresponding to the locking and the clamping position, is a pressure chamber located between clamping bolt and piston. It is understood that this pressure chamber can be charged with a pressure medium in order to move clamping bolt and piston along the groove curve guide in such a way that they are spaced a maximum distance apart.

The other power source for inducing the clamping bolt to engage in a movement to the grooved curve guide final position corresponding to the release and loading position may be a reaction chamber located between clamping bolt and piston, and hence a chamber which can be charged with a pressure medium. It is understood that the forces exerted in the reaction chamber and in the pressure chamber are in opposite directions. However, the other power source may also be a spring located between clamping bolt and piston, so that the separate provision of a sealed chamber and its control is not required.

The most extensive variations in the control result when each power source, besides the pressure loaded piston, has its own control with pressure means so that each power source can be turned on or off separate from the other power source. This obviates geometric relative proportions between the chambers, so that there is more freedom from a design viewpoint. However, it is also possible, depending on expedience, to combine some controls. For example, there may be a common control for the piston and the pressure chamber. When providing a reaction chamber in addition to a pressure chamber, the pressure chamber must have a comparatively smaller active area so that with simultaneous control of reaction chamber and pressure chamber, the force acting in the pressure chamber prevails.

When using a spring for the other power source, the first power source has a greater force than the second power source so that the spring force is overcome and a locking position is obtained.

In addition, the clamping bolt has a stop corresponding to the housing of the arrangement. It is located in such a way that it supports the power source of the reaction chamber. By supporting the clamping bolt on the housing, the support takes part of the force. Providing the stop has the additional advantage that it makes possible lifting of the freight container, for example with a loading device, other parts of the arrangement are protected against destruction. The distance of the stop from the housing in the loading position is smaller than or equal to the maximum stroke of the piston. This stroke is composed of the height of the corner bracket and the height of the groove curve guide.

The piston itself can be displaced lengthwise, but without rotation, in the cylinder of the housing, to make possible a definite association of the rotary motion of the locking head of the clamping bolt. For this purpose, the piston may have a hollow piston rod, which projects into the clamping bolt and which has a noncircular area, with a corresponding bolt in a fixed location on the housing. The piston may have a hollow extension with which it is guided on the bolt while sealed. In this manner, the space covered by the bolt can be recovered for pressure charging the piston. The piston may have a second hollow extension in which the clamping bolt slides, is sealed, so that there is the possibility to locate the pressure chamber and, if necessary, the reaction chamber here.

The novel features which are considered as characteristic for the invention are set forth in particular in the appended claims. The invention itself, however, both as to its construction and its method of operation, together with additional objects and advantages thereof, will be best understood from the following description of the specific embodiments when read in connection with the accompanying drawings.

BRIEF DESCRIPTION OF THE DRAWING

FIG. 5 shows a schematic top view of the locking head in the locked clamping position; and FIG. 6 shows a schematic top view of the locking head in the release and loading position;

DESCRIPTION OF THE PREFERRED EMBODIMENT

Housing 2 of the arrangement is preferably fastened in a releasable fashion to the vehicle frame 1. The vehicle frame holds either an interchangeable platform 3 or a container 4 which are only shown by a dot-dashed line. It is understood that several such devices may be distributed over the vehicle frame 1.

Figure 1:
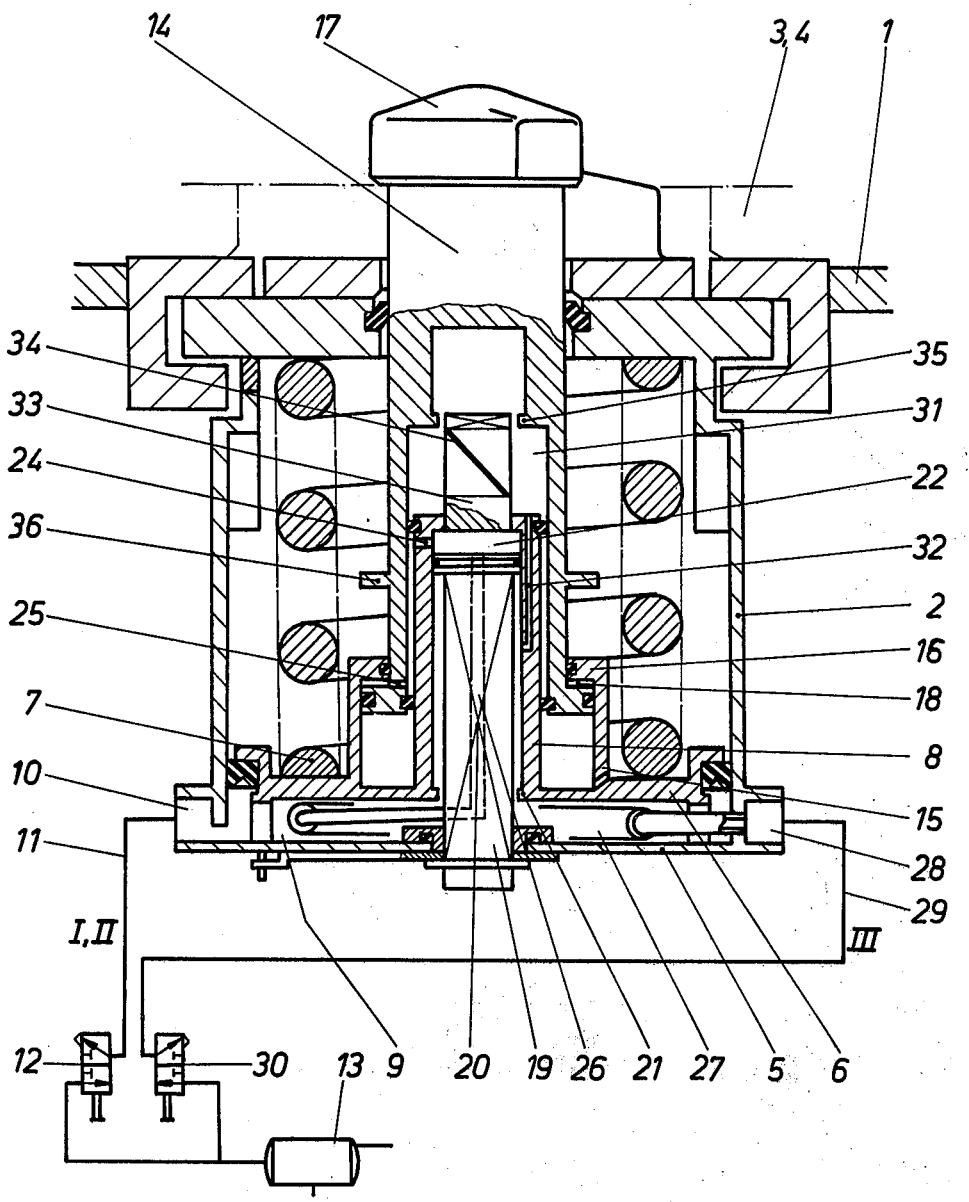
FIG. 1 shows a cross-section through a first embodiment in the clamped position.

Housing 2 is closed at its bottom side by a housing bottom, while on top it is closed with a cover or similar item. Housing 2 holds a piston 6 which provides a seal and is displaceable; this piston is supported on housing 2 via a compression spring 7. Piston 6 has a hollow extension 8. The piston 6 and the extension 8 enclose a pressure chamber 9. The pressure chamber 9 has connection 10 which may be supplied with compressed air from tank 13 via line 11 and the pilot valve 12, or the air may be released through this connection. FIG. 1 shows the clamped position where pressure chamber 9 is not under pressure.

In piston 6, the clamping bolt 14 is sealed in a manner shown by means of the hollow extension 8 and can be rotated. This also is the case with another hollow extension 15 of piston 6 whose rim 16 encloses the piston-side end of clamping bolt 14 as shown in the drawing. Through the construction of the parts and the seals shown, there is created a reaction chamber 18 which is annular and, when charged with compressed air, causes piston 6 and clamping bolt 14 to approach one another. On the other end, the clamping bolt 14 is equipped with a locking head 17.

Housing bottom 5 also holds a bolt 19 which is rotary and sealed. Bolt 19 normally is locked in place. Rotatability is provided only to permit manual actuation of the arrangement, if, in the case of compressed air failure, the clamping position is to be released in an emergency. The stationary bolt 19 along its periphery has a noncircular surface profile 20 which is preferably a square. Piston 6 has a corresponding collar 21 so that it cannot turn when bolt 19 is stationary. On the end which projects into the hollow extension 8 of piston 6, bolt 19 is sealed. Above bolt 19 there appears a space 22 which is connected, via a bore 24 in the extension 8 and another bore 25, with the reaction chamber 18. On the other hand, bolt 19 contains a channel 26 to which, via a flexible line 27, connection 28 is connected. Via this connection 28 and line 29 and control valve 30, compressed air can be delivered to reaction chamber 18.

Between piston 6 and clamping bolt 14, there is a pressure chamber 31 which is arranged in such a way that by charging it with compressed air, the clamping bolt 14 and the piston 6 can be moved apart, and hence can be charged in different directions. Pressure chamber 31 is connected to pressure chamber 9, beyond the play of collar 21 on bolt 19 through bore 32.

A grooved curve guidance, which also is located in pressure chamber 31, is provided between piston 6 and clamping bolt 14. For this purpose, the hollow extension 8 has a guide piece 33 which, along a portion of its length, has a noncircular helical cross-section 34 that mates with a corresponding rim 35 on the clamping bolt 14 so that with a relative motion of clamping bolt 14 and piston 6 in the axial direction, there results a rotation of clamping bolt 14 with locking head 17. The rotation is such that the maximum angle of rotation is 90°. In order to facilitate the motion, the pressure chamber 31 must have the design shown.

The pressure chamber 9 with its pressure charge via pilot valve 12, line 11 and connection 10 represents the first power source I which can act on the arrangement or its essential parts, namely piston 6 and clamping bolt 14. A second power source II is formed by the pressure chamber 31 and its pressure charge via the line connection from pilot valve 12 via bore 32. It is understood that the two power sources I and II may be actuated via two separate pilot valves with separate line connections. However, for simplicity's sake, these two power sources I and II are combined in the embodiment according to FIG. 1. A third power source III is provided by the reaction chamber 18 and its charging via pilot valve 30, line 29, connection 28, flexible line 27, canal 26, chamber 22, bores 24 and 25. It is important that power sources II and III can be actuated independently of one another. The power sources II and III have acting directions opposite to one another. Power source IV which is opposite power source I, is formed by retightening spring 7.

The four power sources I, II, III, IV, in combination with a suitable control, are used to place the clamping bolt with its locking head 17 into four different positions successively in order to perform the tasks of locking properly. The function of the arrangement according to FIG. 1 is analoguos to the function (to be described later) of another embodiment of the arrangement as shown by FIGS. 2 through 6 in the various positions.

It should be mentioned that with the embodiment of FIG. 1, the clamping bolt 14 has a stop 36 which must be dimensioned, located and designed in accordance with the motions and forces occurring. Stop 36 works in connection with the upper portion of the housing 2. The main function of stop 36 is to support the power source III of the reaction chamber 18. In addition, the clamping bolt 14 is supported by stop 36 on housing 2, when the container 3 with unreleased base and together with it, is raised or moved by means of a loading device.

Figure 2:
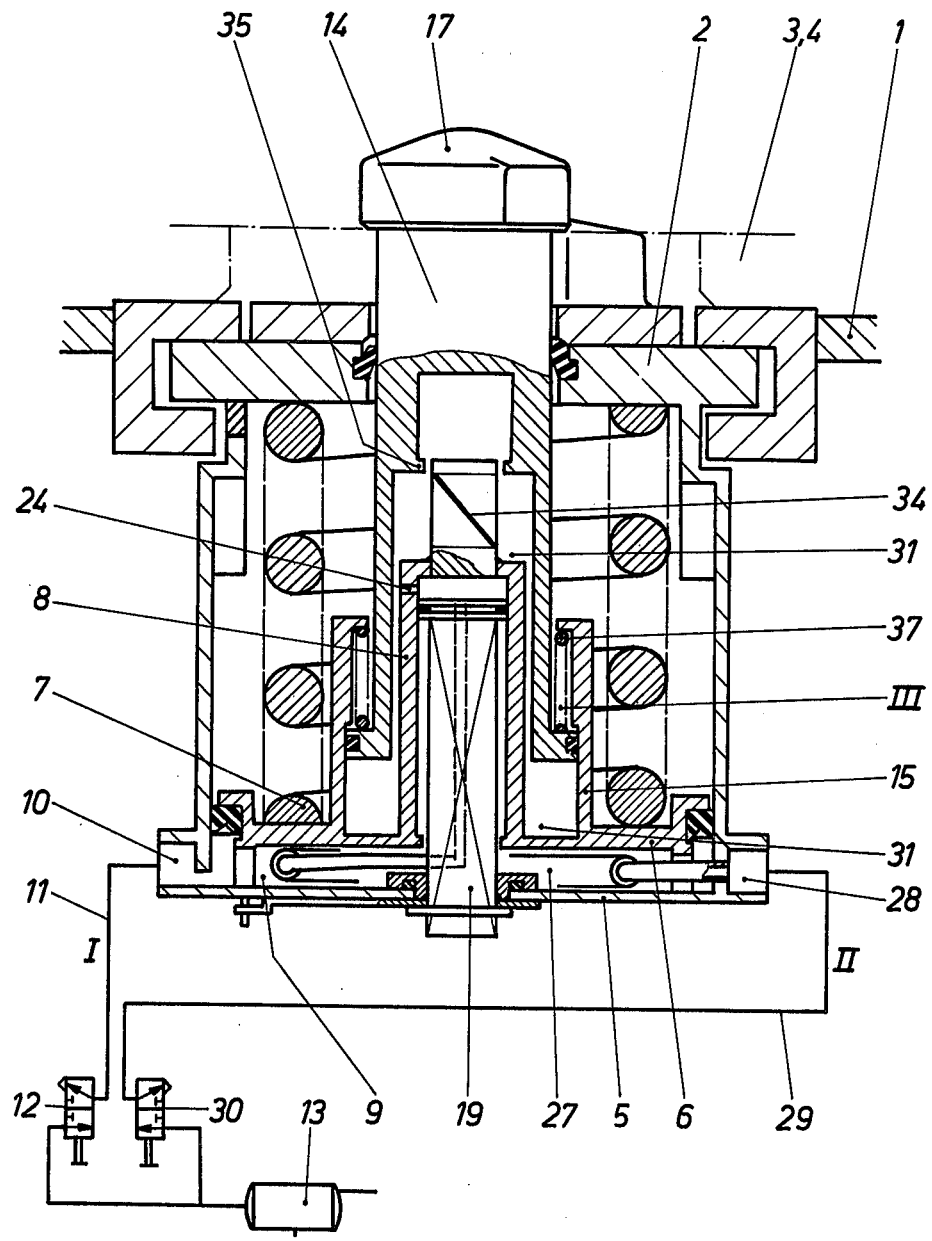
FIG. 2 shows a cross-section through a second embodiment in the clamped position.

Another embodiment of the arrangement is shown in FIGS. 2 through 6. It differs from that of FIG. 1 in that the power source is not pneumatic, but is formed by spring 37 which is placed between piston 6 and the clamping bolt 14 in such a way that its force is opposite to the force of power source II. The pressure chamber 31 has a larger acting surface. Control is not jointly with power source I, but separately via control valve 30, line 29, connection 28, etc. Also, stop 36 as a separate component on clamping bolt 14 is lacking. It is formed by the end of the lengthened extension 15 which also supports spring 37. The embodiment of FIG. 2 is simpler than that of FIG. 1 since the number of seals is reduced and the power source III consists of spring 37. It is clear to the technical expert that the arrangement can also be operated by a single line 11 so that line 29 and control valve 30 can be dispensed with. It is only necessary to influence the sequence of individual motions in a different manner in order to safely attain the various positions of the clamping bolt. However, the resulting dynamic problems can be solved. Springs 7 and 37, as well as the grooved curve guide are described in U.S. Pat. No. 3,924,544, and are for this reason not described in further detail here.

With respect to the concept of "form linkage or locking", this may be understood by referring to FIG. 5 of U.S. Pat. No. 3,439,821. There it shows that in the locking arrangement, the bolt (22) engages a hole in the freight container (2) with play. Thus, no force is transmitted between the bolt (22) and freight container (2), and hence the connection is not "force locked". Because of the play, during travel of the freight container on the road, the freight container may repeatedly lift and lower from the road because of vibrations, so that considerably disturbing shock-like noises develop. However, with the present invention, in addition to form-locking, there always is a "force-locking" so that the disturbing noises cannot develop.

The mode of operation of the device according to FIGS. 2 through 6 is as follows:

There are four main positions:

In the clamping position according to FIG. 2, the locking head 17 of the clamping bolt 14 is located in the corner bracket of the container 3 or of the interchangeable platform 4 so that the freight container is held by power source IV, namely the clamp force spring 7, and is continually retightened. Since power source IV by far exceeds power source II, the relative position shown in FIG. 2 results. It is to be understood that the forces of power sources I and II are not effective because the associated pressure chambers 9 and 31 are vented.

Figure 4:
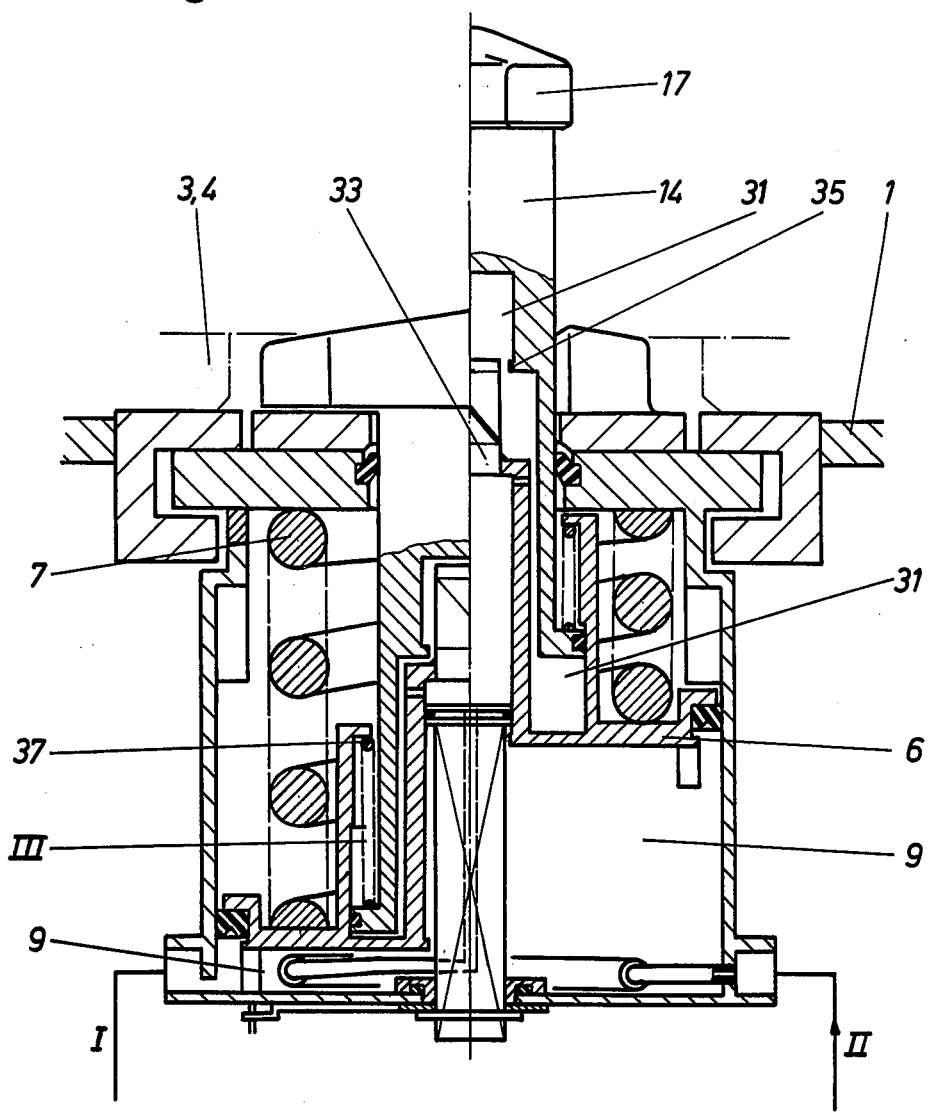
FIG. 4 shows a semi-section for the loading position and for the locked position of the arrangement of FIG. 2.
Figures 7, 7A, 7B, 7C:
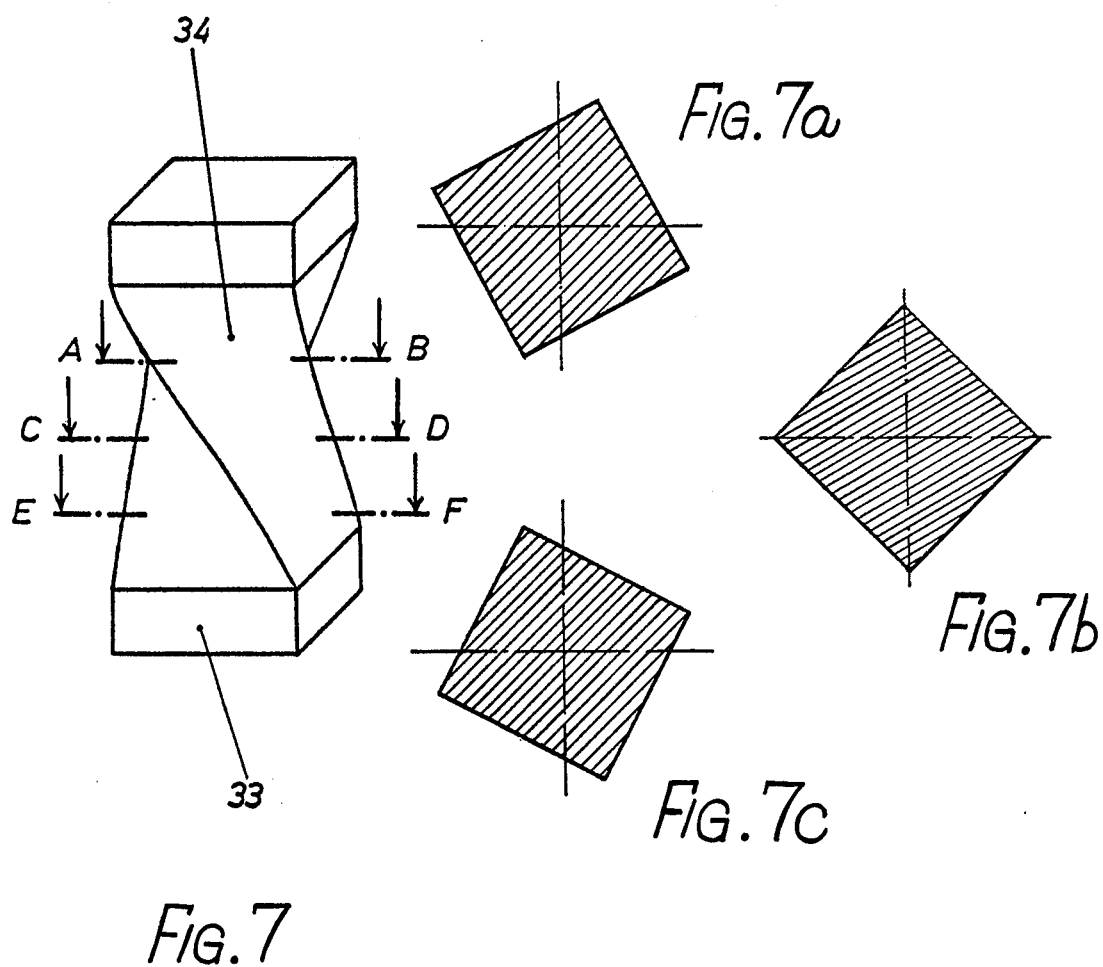
FIG. 7 shows a perspective view of a guide element used in the arrangements of FIGS. 1 and 2.
FIG. 7a is a cross-sectional view taken along the line A-B in FIG. 7.
FIG. 7b is a cross-sectional view taken along line C-D in FIG. 7.
FIG. 7c is a cross-sectional view taken along line E-F in FIG. 7.

As second position after the clamping position of FIG. 2, the locking position of FIG. 4, right-hand section is attained in one work cycle. To get to the locking position from the clamping position, first power source II, is actuated by applying compressed air to pressure chamber 31. This ensures that on the way to attaining the locking position, the locking head 17 of clamping bolt 14 is not rotated. In order to finally reach the locking position, pressure chamber 9 is also charged with compressed air. Thus, power source I is introduced, so that then the components are shifted to the locking position of FIG. 4, right-hand half section. In the locking position there still is form linkage, but no force linkage.

Figure 3:
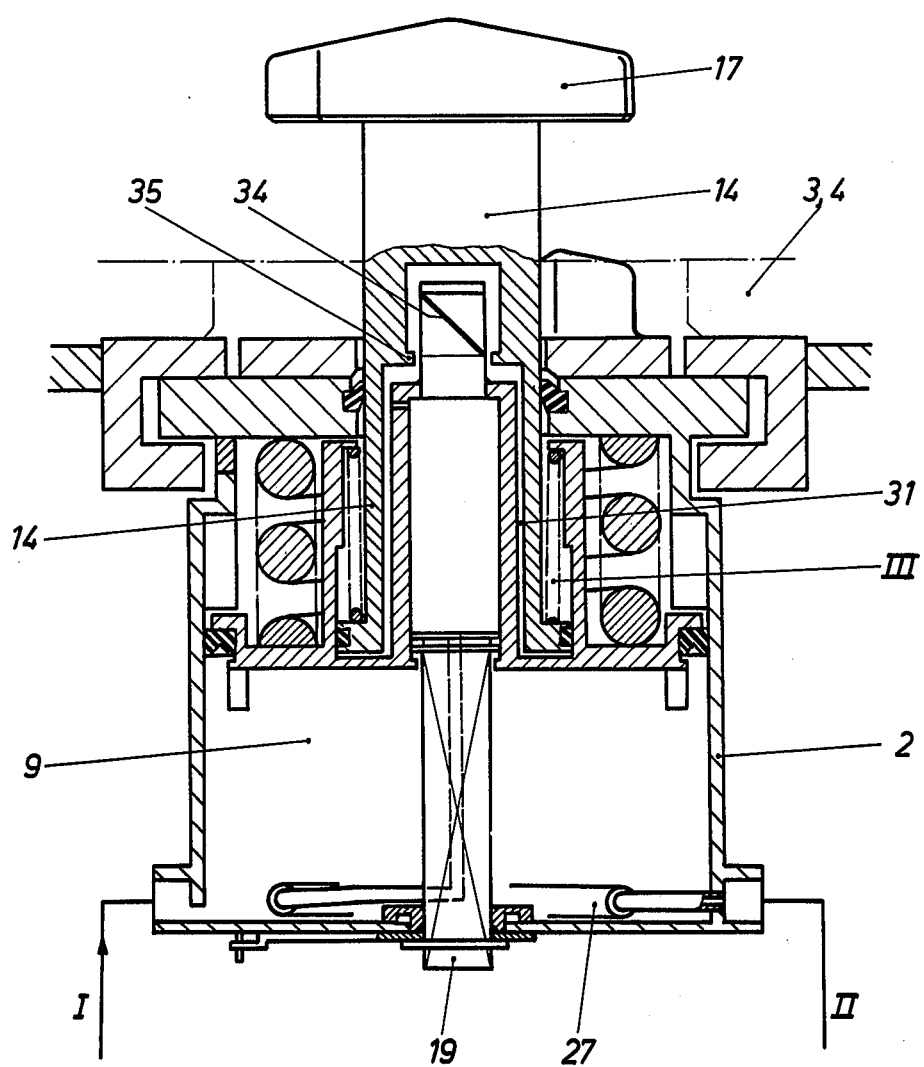
FIG. 3 shows a cross-section through the release position of the arrangement of FIG. 2.

From the locking position, one wants to attain release position according to FIG. 3. For this purpose it is only necessary to turn the locking head. By venting pressure chamber 31, i.e., elimination of power source II, power source III, spring 37, can cause the stationary piston 6 and the clamping bolt 14 to come closer together, with the grooved curve guide 34, 35 bringing about rotation of the locking head 17 during an axial motion. If the release position according to FIG. 3 is reached, the form linkage is terminated also. However, to a certain extent the locking head 17 is located in the corner bracket of the associated freight container. The freight container is still secured against shifting and an interchangeable platform cannot yet be horizontally pulled off the vehicle frame 1.

This becomes possible only after reaching the loading position according to FIG. 4, left-hand half section. To reach the release position, it is necessary to shut off power source I, the charging with compressed air of pressure chamber 3 so that the retightening spring 7 axially displaces piston 6 and clamping bolt 14 together, without any rotation of the clamping bolt. In the loading position, the freight container of any type can be loaded horizontally and vertically. If a freight container is put on, the work cycle runs in reverse from the loading position, via the release position and the locking position to the clamped position, in accordance with FIG. 2, with power sources I, II, III, IV acting accordingly.

It should be mentioned that the two power sources I and II, are vented both in the clamping position of FIG. 2 and the release position of FIG. 3 i.e., without effect (action).

In order to indicate the position of locking head 17, FIGS. 5 and 6 are provided. The locking head 17 assumes the position according to FIG. 5 both in the clamping position of FIG. 2 and in the locking position of FIG. 4 right-hand semi-section. FIG. 6 belongs to the release position according to FIG. 3 or to the loading position according to FIG. 4, left-hand semi-section.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. An arrangement for locking a freight container to a wheeled base comprising: brackets on said freight container; grooved curve guide means; spring-loaded clamping bolts on said base and engaging said brackets on said freight container with both form and force linkage; each of said clamping bolts having a locking head and being movable from a clamping position to a release position by a rotary lifting motion with said grooved curve guide means; a pressure-charged spring-loaded piston rotatable relative to a clamping bolt, said piston having a first hollow extension, said clamping bolt being held axially displaceable in said first hollow extension of said piston; said piston having a second hollow extension, said grooved curve guide means being located between the clamping bolt and said piston at the upper end of said second hollow extension of said piston; two opposite power sources for applying the relative motion of said clamping bolt and said piston along said grooved curve guide means; a container being horizontally slidable onto the wheeled base, said clamping bolt and said piston being axially displaceable relative to each other, said two power sources displacing said clamping bolt and said piston toward or away from each other along said grooved curve guide means.

2. The arrangement as defined in claim 1 wherein said two power sources are actuatable independently of one another.

3. The arrangement as defined in claim 1 wherein one of said power sources comprises a pressure chamber located between said clamping bolt and said piston for pressure charging said clamping bolt for movement into a final position of said grooved curve guide means corresponding to a locking and clamping position.

4. The arrangement as defined in claim 1 wherein one of said power sources comprises a reaction chamber between said clamping bolt and said piston for pressure charging said clamping bolt for movement to a final position of said grooved curve guide means corresponding to a release and loading position.

5. The arrangement as defined in claim 1 wherein one of said power sources comprises spring means between said clamping bolt and said piston for urging said clamping bolt into a final position of said grooved curve guide means corresponding to a release and loading position.

6. The arrangement as defined in claim 1 including separate control means for each of said power sources in addition to said piston.

7. The arrangement as defined in claim 1 wherein one of said power sources comprises a pressure chamber between said clamping bolt and said piston; and common control means for said piston and said pressure chamber.

8. The arrangement as defined in claim 7 wherein the other one of said power sources comprises a reaction chamber, said pressure chamber having a relatively small active area in conjunction with said reaction chamber.

9. The arrangement as defined in claim 5 wherein one of said power sources has substantially greater force then the other one of said power sources.

10. The arrangement as defined in claim 1 including a housing; stop means on said clamping bolt and corresponding to said housing, one of said power sources comprising a reaction chamber, said stop means being located for supporting the power source of said reaction chamber.

11. The arrangement as defined in claim 10 wherein the distance of said stop means from said housing in a loading position is substantially smaller than or equal to the maximum stroke of said piston.

12. The arrangement as defined in claim 1 wherein said piston is displaceable longitudinally while being inhibited from rotating.

13. The arrangement as defined in claim 12 including a housing; said second hollow extension on said piston projecting into said clamping bolt; said second extension having a collar; and corresponding bolt means fixed to said housing.

14. The arrangement as defined in claim 13 wherein said piston carries said second hollow extension so that it is sealingly guided on said corresponding bolt fixed to said housing.

15. The arrangement as defined in claim 13 wherein said clamping bolt slides sealingly in said first hollow extension.

16. The arrangement as defined in claim 1 wherein said two power sources are actuatable independently of one another, said power sources comprising a pressure chamber located between said clamping bolt and said piston for pressure charging said clamping bolt for movement into a final position of said grooved curve guide means corresponding to a locking and clamping position. control means for said piston and said pressure chamber, one of said power sources comprising a reaction chamber, said pressure chamber having a relatively small active area in conjunction with said reaction chamber, one of said power sources having substantially greater force than the other one of said power sources, a housing, stop means on said clamping bolt and corresponding to said housing, said stop means being located for supporting the power source of said reaction chamber, the distance of said stop means from said housing in a loading position is substantially smaller than or equal to the maximum stroke of said piston, said piston being displaceable longitudinally while being inhibited from rotating, said piston carrying said second hollow extension so that it is sealingly guided on a corresponding bolt fixed to said housing, said clamping bolt sliding sealingly in said first hollow extension.

* * * * *